Patented Apr. 20, 1937

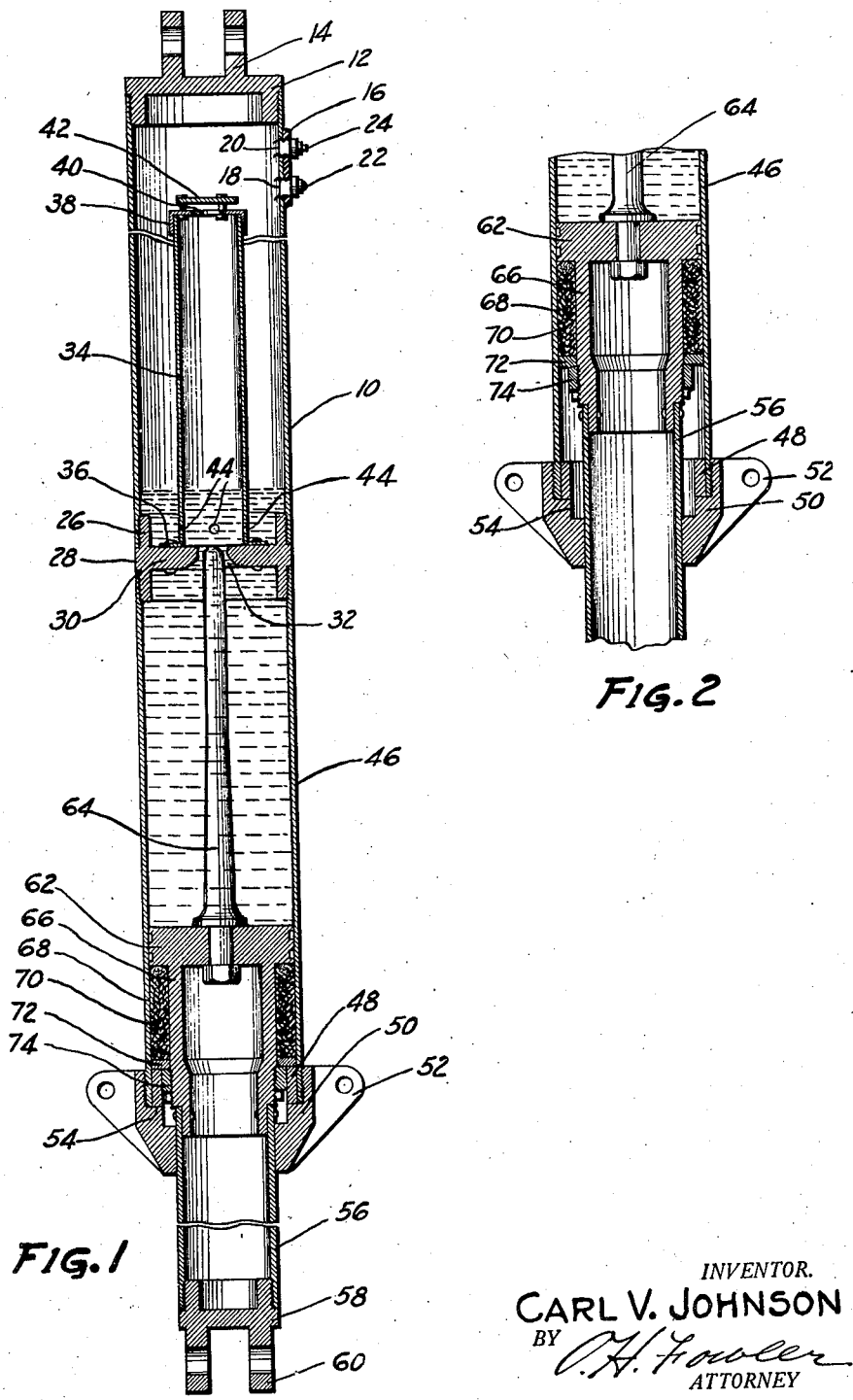

2,077,934

UNITED STATES PATENT OFFICE 2,077,934

OLEO GEAR

Carl V. Johnson, South Bend, Ind., assignor to Bendix Aviation Corporation, South Bend, Ind., a corporation of Delaware Application September 17, 1931, Serial No. 563,453

12 Claims. (Cl. 267—64)

This invention relates to shock absorbers and more particularly to shock absorbing struts for aircraft.

Shock absorbing struts are extensively used in landing gears for airplanes. Various types have been devised and a few now in general use have proved reasonably satisfactory. The most satisfactory shock struts are those known in the art as pneumatic, hydraulic, and combined pneumatic and hydraulic. The present invention has to do with the latter type.

Broadly, the invention comprehends a pneumatic hydraulic shock absorbing strut designed to absorb the initial shock of landing and subsequent shock developed in taxiing over rough and uneven ground.

In the illustrated embodiment of the invention the strut comprises telescopic members one of which includes a cylinder having a diaphragm provided with an orifice. The diaphragm supports an internal cylinder having one end in communication with the orifice in the diaphragm, and its other end closed by a valve. The other member includes a piston positioned for reciprocation in the cylinder. This piston carries a metering pin arranged for cooperation with the orifice in the diaphragm. The piston has a skirt on which is carried packing material and retaining means therefor. The packing material functions as a cushion for the piston when the strut is in a fully extended position.

An object of the invention is to provide a shock strut having relatively few parts which may be easily and quickly assembled.

Another object of the invention is to provide a shock strut in which standard tubing may be used for certain component parts.

Another object of the invention is to provide a shock strut having a two part cylinder only one of which needs to be finished internally.

Another object of the invention is to provide a shock strut of the combined pneumatic hydraulic type in which the air chamber is as large as the oil chamber, so that lower pressures may be used.

A feature of the invention is to provide a shock strut comprising a fixed and movable member and means for bracing the fixed member including drag struts and means for securing the drag struts to the fixed member.

Another feature of the invention is a shock strut in which straight tubing is used for the telescopic members of the structure.

Another feature of the invention is a shock strut including a two part cylindrical chamber and an apertured diaphragm forming a union between the parts.

Another feature of the invention is a shock strut including a piston having a skirt and packing material carried on the skirt serving as a cushion when the strut is in the fully extended position.

Other objects and features of the invention will appear from the following description taken in connection with the drawing, in which:

Figure 1 is a longitudinal sectional view of a shock strut completely extended, and Figure 2 is an enlarged view illustrating the strut partially collapsed.

Referring to the drawing for more specific details of the invention, 10 represents a cylinder closed at one end by a cap 12 provided with a clevis 14. This clevis provides a suitable means through which the cylinder may be secured to the fuselage of an airplane. Arranged on the wall of the cylinder adjacent the cap is a reinforcing plate 16. The plate and the cylinder are bored and threaded as indicated at 18 and 20 to receive respectively a plug 22 which may be removed for the purpose of introducing oil into the cylinder, and a valve 24 through which air may be introduced into the cylinder. The other end of the cylinder 10 has threaded or otherwise secured therein one end of a sleeve 26.

As shown, the sleeve 26 has a circumferential flange 28 abutting one end of the cylinder 10. This flange has the same diameter as the cylinder so that when the sleeve is threaded in the cylinder a smooth unbroken surface is presented. The sleeve 26 has therein a diaphragm 30 provided with an orifice 32. The diaphragm 30 supports a chamber or cylinder 34 arranged concentrically within the chamber 10 in direct communication with the orifice in the diaphragm. The chamber 34 has on one end a flange 36 which may be riveted or otherwise secured to the diaphragm and the other end of the cylinder 34 is provided with a cap 38 having an orifice 40 controlled through a flap valve 42, and in the base of the cylinder near the end secured to the diaphragm are spaced vents 44.

The sleeve 26 has threaded or otherwise secured thereto one end of a cylinder 46 abutting the circumferential flange 28. This cylinder has fitted into its other end a ring 48 secured against displacement by a cylinder head or collar 50 having lugs 52 to which may be secured drag struts, not shown. The collar 50 has a triple diametral bore. The larger bore is threaded to receive the cylinder 46 and between the larger bore and the intermediate bore is a shoulder 54 abutting the cylinder 46 and the ring 48. The ring 48 also may serve as a reinforcement for the threaded end of the cylinder 46, and prevent collapsing or buckling thereof.

Positioned for reciprocation in the smaller bore of the collar is a piston rod including a tubular cylindrical member 56 having secured to the outer end thereof a cap 58 provided with a clevis 60 for the attachment of an axle or other parts associated with the wheels of the airplane. Suitably secured to the inner end of the member 56 is a piston head 62. As shown, the piston head is fitted snugly within the cylinder 46, and the head carries a metering pin 64 adaptable for cooperation with the orifice 32. The piston head 62 has a skirt 66 arranged concentrically, so as to provide in conjunction with the cylinder 46 a packing gland 68 for the reception of suitable packing material 70. The packing material is carried on the skirt and is retained against displacement between the head 62 and a packing retaining ring 72 sleeved on the skirt and held against displacement by a collar member 74 threaded on the skirt.

The packing material provides a suitable leakproof connection between the piston and the cylinder and due to its elastic characteristics and its annular length also provides an ideal cushion for the piston on the return stroke and when the strut is in the fully extended position. Any packing material may be used, such as rubber or rubber compositions, leather and the like, it being understood that the damping liquid and packing material must be so chosen that one does not affect the other.

Assuming that the strut is filled with suitable hydraulic fluid and air or gas, the strut will under impact of landing cause the hydraulic fluid to be forced through the orifice in the diaphragm past the metering pin into the upper chamber, where the air or gas will be compressed by the rise of the liquid and this combined resistance offered by the compression of the air or gas and the flow of liquid.

On the compression stroke the liquid passes freely through the flap valve on the inner chamber into which the metering pin moves and on the return stroke the flap valve closes due to the pressure of the compressed air or gas thus forcing the liquid to return through the small vents or orifices near the base of the inner chamber. This prevents sudden rebound that would otherwise result.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A shock absorbing strut comprising a two part cylinder and a union for the parts including a sleeve having a diaphragm and a circumferential flange.

2. A shock absorbing strut comprising a two part cylinder and a union for the parts including a sleeve having a diaphragm provided with an orifice, and a circumferential flange of the same diameter as the parts of the cylinder.

3. A shock absorbing strut comprising a two part cylinder, a union for the parts including a sleeve, a diaphragm in the sleeve provided with an orifice, and a circumferential flange forming shoulders for the adjacent ends of the parts.

4. A shock absorbing strut comprising a cylinder, a diaphragm in the cylinder having an orifice, a piston positioned for reciprocation in the cylinder, comprising a head on the piston fitted snugly in the cylinder, and a skirt having a smaller diameter than the head, packing material on the skirt, means for retaining the packing material on the skirt, a collar on the cylinder embracing the piston and a metering pin carried by the piston cooperating with the orifice in the diaphragm.

5. A shock absorbing strut comprising a cylinder, a diaphragm positioned therein, having an orifice, a piston positioned for reciprocation in the cylinder, a metering pin carried by the piston for cooperating with the orifice, and means carried by the piston providing a cushion for the piston on the return stroke and when the strut is in a fully extended position.

6. A shock absorbing strut comprising a cylinder, a diaphragm in the cylinder having an orifice, a piston having a head positioned for reciprocation in the cylinder, a piston rod, a metering pin carried by the piston for cooperating with the orifice, a collar on the cylinder embracing the piston rod and means interposed between the piston head and the collar providing a cushion for the piston on the return stroke, and when the strut is in a fully extended position.

7. A shock absorbing strut comprising a two part cylinder, a sleeve connecting the parts, a diaphragm in the sleeve having an orifice, a piston and piston rod positioned for reciprocation in the cylinder, a metering pin carried by the piston adaptable for cooperating with the orifice, a collar on the cylinder embracing the piston rod, means for securing the collar against displacement including means for bracing the cylinder against movement, and means carried by the piston providing a cushion therefor on the return stroke and when the strut is in the fully extended position.

8. A shock absorbing strut comprising a two part cylinder, a sleeve connecting the parts, a diaphragm in the sleeve having an orifice, an internal cylinder supported by the diaphragm having one end communicating with the aperture in the diaphragm, a valve on the other end of the internal cylinder, a piston and piston rod positioned for reciprocation in the cylinder, a metering pin carried by the piston arranged for cooperating with the orifice in the diaphragm, a collar on the cylinder embracing the piston rod, means for retaining the collar against displacement including means for bracing the cylinder against movement, and means on the piston tending to cushion the piston on the return stroke and when the strut is in the fully extended position.

9. In a shock strut, a cylinder, a piston, a cylinder head threaded on the outside of said cylinder and a piston rod passing through said cylinder head, packing means on said piston rod within said head, means on said rod for limiting the maximum axial length of said packing, and an annular collar snugly fitting the interior of said cylinder and resting on said head, said collar adapted to compress and reduce the axial length of said packing to absorb shock when said piston is driven forcibly toward said head.

10. In a shock strut, a cylinder, a piston, a cylinder head threaded on the outside of said cylinder, a piston rod passing through said cylinder head, a loose retaining ring on said piston rod together with a collar against which said ring may rest, said ring and collar being within said cylinder, stuffing material between said retaining ring and piston head, and an annular collar snugly fitting within said cylinder and seated on the head adapted to engage the outer periphery of said retaining ring to compress said packing upon extreme piston movement toward said head.

11. A shock absorbing strut comprising a cylinder, a diaphragm centrally located therein having a central orifice, a piston and piston rod arranged for reciprocation in the lower portion of said cylinder, a metering pin secured to said piston and coacting with said orifice, and a metering pin housing secured to the upper side of said diaphragm surrounding said orifice having a one-way valve in the top thereof, and a bleed port in the lower side wall thereof.

12. A shock absorbing strut comprising a cylinder, an impervious diaphragm save for a central orifice centrally located therein, a piston and piston rod arranged for reciprocation in the lower portion of said cylinder, a metering pin secured to said piston and coacting with said orifice, and a metering pin housing secured to the upper side of said diaphragm surrounding said orifice having a one-way valve in the top thereof, and a bleed port in the lower side wall thereof.

CARL V. JOHNSON.